United States Patent
Mondal et al.

(10) Patent No.: US 11,920,032 B2
(45) Date of Patent: Mar. 5, 2024

(54) RUBBER COMPOSITION FOR TYRE RIM CUSHION

(71) Applicant: Apollo Tyres Global R&D B.V., Enschede (NL)

(72) Inventors: Anup Mondal, Enschede (NL); Henrik Stevens, Hannover (DE); Louis Reuvekamp, Enschede (NL)

(73) Assignee: Apollo Tyres Global R & D B.V., Enschede (NL)

( * ) Notice: Subject to any disclaimer, the term of this patent is extended or adjusted under 35 U.S.C. 154(b) by 321 days.

(21) Appl. No.: 17/280,272

(22) PCT Filed: Sep. 26, 2019

(86) PCT No.: PCT/EP2019/076103
§ 371 (c)(1),
(2) Date: Mar. 26, 2021

(87) PCT Pub. No.: WO2020/064960
PCT Pub. Date: Apr. 2, 2020

(65) Prior Publication Data
US 2022/0112360 A1    Apr. 14, 2022

(30) Foreign Application Priority Data
Sep. 28, 2018    (LU) .................................. 100966

(51) Int. Cl.
| | |
|---|---|
| *C08L 7/00* | (2006.01) |
| *B60C 1/00* | (2006.01) |
| *C08F 222/06* | (2006.01) |
| *C08J 3/24* | (2006.01) |
| *C08K 3/013* | (2018.01) |
| *C08K 3/04* | (2006.01) |
| *C08L 9/00* | (2006.01) |
| *C08L 19/00* | (2006.01) |
| *C08L 23/08* | (2006.01) |

(52) U.S. Cl.
CPC .............. *C08L 7/00* (2013.01); *B60C 1/0016* (2013.01); *C08F 222/06* (2013.01); *C08J 3/24* (2013.01); *C08K 3/013* (2018.01); *C08K 3/04* (2013.01); *C08L 9/00* (2013.01); *C08L 23/0869* (2013.01); *C08L 2205/03* (2013.01)

(58) Field of Classification Search
CPC .... C08L 7/00; C08L 9/00; C08L 23/08; C08F 222/06; C08J 3/24; B60C 1/00; C08K 3/04
USPC ........................................................ 523/156
See application file for complete search history.

(56) References Cited

U.S. PATENT DOCUMENTS

| | | |
|---|---|---|
| 6,602,954 B1 | 8/2003 | Lin |
| 2013/0150484 A1 | 6/2013 | Basu et al. |
| 2018/0105693 A1 | 4/2018 | Lange et al. |

FOREIGN PATENT DOCUMENTS

| | | | | |
|---|---|---|---|---|
| EP | 0969039 | 1/2000 | | |
| JP | 2017110159 | 6/2017 | | |
| JP | 2017110159 A | * 6/2017 | ............... | B60C 1/00 |
| JP | 2017110161 | 6/2017 | | |

OTHER PUBLICATIONS

International Search Report and Written Opinion for corresponding European Patent Application No. PCT/EP2019/076103 dated Nov. 11, 2019.
Search Report for corresponding Luxembourg Patent Application No. LU100966 dated Jun. 11, 2019.

* cited by examiner

*Primary Examiner* — Deve V Hall
(74) *Attorney, Agent, or Firm* — Renner, Otto, Boisselle & Sklar, LLP

(57) ABSTRACT

The present invention relates to a cross-linkable rubber composition, the cross-linkable rubber composition comprising a natural rubber (NR), a filler, and a resin. The resin is a terpolymer of ethylene, acrylic ester and maleic anhydride and is present in an amount ranging from ≥5 to ≤20 phr.

11 Claims, No Drawings

RUBBER COMPOSITION FOR TYRE RIM CUSHION

This application is a national phase entry of International Application No. PCT/EP2019/076103 filed on Sep. 26, 2019 and published in the English language, which claims priority to Application No. LU 100966 filed on Sep. 28, 2018, both of which are hereby incorporated by reference.

The present invention relates to a cross-linkable rubber composition, a cross-linked rubber composition obtained by cross-linking such a rubber composition, a method of preparing a tyre and a tyre comprising a rim cushion.

A modern tyre has a complex geometry comprising different components with special compounds. The tyre is connected to the rim by a rim cushion. The rim cushion is provided on the outer surface of a bead portion of a pneumatic tire in a manner that the rim cushion is in close contact with a rim when the tire is mounted on a rim of a wheel. Rubber for a tyre rim cushion sustains a strong compressive load in order to support the load of a vehicle, so there is a demand for good mechanical properties. On the other hand, there is the need to absorb more or less constant hysteretic forces.

A rubber for a tyre rim cushion can be optimized to exhibit good hysteresis property by using low filler amount, but this normally results in poor mechanical properties. On the other hand, by changing the polymer blend the hysteresis property will be improved, but this leads to impairment in the mechanical properties. In order to obtain good rim cushions, these properties need to be balanced simultaneously.

JP 2017-110161 A describes a rubber composition comprising a diene rubber, a ternary copolymer of ethylene, (meth) acrylic acid ester and maleic anhydride, acid-modified polyolefin, and at least one filler selected from the group consisting of carbon black and white filler, wherein based on 100 parts per mass of diene rubber, the total content of the ternary copolymer and the acid-modified polyolefin is 3 to 30 parts per mass. Further a pneumatic tire formed by using the rubber composition is described.

U.S. Pat. No. 6,602,954 B1 describes a tire component comprising a vulcanized rubber; and from greater than 0 up to about 35 parts by weight per 100 parts by weight rubber of a functionalized polyolefin that includes at least one functionality that derives from maleic anhydride, acrylic acid, or epoxides.

Optimizing the hysteresis property normally results in trade-off in mechanical performance. The present invention has the object to provide a method for producing a rubber composition to be used in a tyre rim cushion to serve well in view of low hysteresis and good mechanical property.

This object is achieved by a cross-linkable rubber composition, a cross-linked rubber composition, a method and tyre comprising a rim cushion. They may be combined freely unless the context clearly indicates otherwise.

Accordingly, a cross-linkable rubber composition is provided, the cross-linkable rubber composition comprising a natural rubber (NR), a filler, and a resin, wherein the resin is a terpolymer of ethylene, acrylic ester and maleic anhydride and is present in an amount ranging from ≥5 phr to ≤20 phr.

In the context of this invention the unit "phr" denotes "per hundred parts by weight of rubber", as it is commonly understood in the art. It is further understood that in formulations discussed in connection with the present invention the phr amount of all rubber components adds up to 100.

It has surprisingly been found that using a terpolymer of ethylene, acrylic ester and maleic anhydride as resin in a carefully chosen phr amount reduces the Payne effect, achieves a lower hysteresis while maintaining good mechanical property. The cross-linkable rubber composition is particularly usable for manufacturing a tyre rim cushion.

The terpolymer of ethylene, acrylic ester and maleic anhydride may be selected from a terpolymer of ethylene/ethyl acrylate/maleic anhydride; ethylene/methyl acrylate/maleic anhydride; and ethylene/butyl acrylate/maleic anhydride. Suitable terpolymers of ethylene, acrylic ester and maleic anhydride are sold under the tradename of "Lotader" from Arkema.

The NR in the rubber component may contain one type of NR rubber or several different types.

The cross-linkable rubber composition according to the invention comprises cross-linkable groups in the rubber component(s). They may be cross-linked (cured, vulcanised) by methods known to a skilled person in the rubber technology field. The cross-linkable rubber compositions may be sulfur-vulcanizable and/or peroxide-vulcanizable. Other vulcanization systems may also be used. If desired, additives can be added. Examples of usual additives are stabilizers, antioxidants, lubricants, dyes, pigments, flame retardants, conductive fibres and reinforcing fibres.

In an embodiment of the cross-linkable rubber composition, the natural rubber is present in an amount of at least 60 phr. The natural rubber may be present in an amount in a range of ≥60 phr to ≤100 phr.

In another embodiment of the cross-linkable rubber composition, the the rubber composition further comprises a butadiene rubber (BR). The BR rubber component may contain one type of BR rubber or several different types. The BR rubber may be present in an amount in a range of ≥0 phr to ≤40 phr.

The BR rubber may have a cis group content in a range of ≥30 to ≤99.9%. The cis content of the butadiene rubber is usually provided by the supplier and is may be determined with FTIR. The method is based on the calculation of the ratio between the intensity of the bands attributable to the 1,4-trans and 1,2-vinyl isomers and a reference band (internal standard) falling at 1312 cm$^{-1}$ (L. J. Bellamy, The Infrared Spectra of Complex Molecules, Vol. 1 Third Edition, Chapman and Hall). The 1,4-cis content is determined by the difference from 100. Sample preparation is performed on a butadiene film, obtained by starting from a solution, evaporated on a KBr window.

The BR rubber may have a low or a high cis group content. In an embodiment of the cross-linkable rubber composition, the butadiene rubber has a cis group content in the range of ≥25 to ≤50%.

In another embodiment of the cross-linkable rubber composition, the butadiene rubber has a cis content in the range of ≥75 to ≤99.9%. The cis group content may be ≥95%. BR with a high degree of branching and a high cis group content may be obtained under nickel catalysis. Both, low cis and high cis butadiene rubber together with a terpolymer of ethylene, acrylic ester and maleic anhydride in the composition can provide low hysteresis combined with good mechanical property of a rim cushion.

The filler may be a particulate filler. In another embodiment of the cross-linkable rubber composition, the filler is carbon black.

In another embodiment of the cross-linkable rubber composition, the carbon black is present in an amount ranging from ≥40 to ≤70 phr.

The composition may comprise the terpolymer of ethylene, acrylic ester and maleic anhydride in an amount ranging from ≥10 phr to ≤20 phr. In another embodiment of the cross-linkable rubber composition, the terpolymer of ethylene, acrylic ester and maleic anhydride is present in an amount ranging from ≥10 phr to ≤15 phr. In a specific embodiment, the cross-linkable rubber composition comprises 15 phr of the terpolymer of ethylene, acrylic ester and maleic anhydride.

In an embodiment of the cross-linkable rubber composition, the cross-linkable rubber composition comprises:

| Natural rubber (NR) | ≥60 phr to ≤100 phr |
| butadiene rubber (BR) | ≥0 phr to ≤40 phr |
| Carbon Black | ≥40 phr to ≤70 phr |
| terpolymer of ethylene, acrylic ester and maleic anhydride | ≥5 phr to ≤20 phr |

The present invention is further directed towards a cross-linked rubber composition, obtained by cross-linking a rubber composition according to the invention.

In an embodiment, the cross-linked rubber composition has a tan delta value at 70° C. (determined from DMA measurements according to ASTM D5963, frequency 10 Hz, 0.1% dynamic strain) of ≤0.13 and a storage modulus G' of ≥8.5.

In another embodiment, the cross-linked rubber composition has a rebound value of ≥64%.

In another embodiment, the cross-linked rubber composition has a tensile strength according to ASTM D412 of ≥19.55 MPa.

In another embodiment, the cross-linked rubber composition has a payne value G' at 0.56% strain of ≤360 kPa, the payne value being determined at a temperature of 100° C. and a frequency of 0.5 Hz.

The present invention is further directed towards a method of preparing a tyre, the method comprising the steps of:
   providing a tyre assembly comprising a cross-linkable rubber composition according to the invention;
   cross-linking at least the cross-linkable rubber composition according to the invention in the tyre assembly.

The present invention also encompasses a tyre comprising a rim cushion, wherein the rim cushion comprises a cross-linked rubber composition according to the invention.

Weight percent, weight-% or wt-%, are synonyms and are calculated on the basis of a total weight of 100 weight % of the respective object, if not otherwise stated. The total amount of all components of the respective object does not exceed 100 wt.-%. The present invention also relates to a tire comprising a tire tread, wherein the tire tread comprises a grafted rubber according to the invention.

The invention will be further described with reference to the following examples without wishing to be limited by them.

Methods:

Dynamic mechanical properties by DMA: Dynamic mechanical analysis (DMA) analysis of rubber compounds was performed for cured samples by Metravib DMA+450 in double shear mode. Samples were cured at 170° C. for 10 minutes shaped as cylinders of 8 mm diameter and 2 mm thickness. DMA are performed by temperature sweep at constant frequency 10 Hz with dynamic strain 0.1% in a temperature range of −80° C. to 25° C. and followed by 6% strain in a temperature range of 25° C. to 80° C. The tan δ at high temperature is predicting rolling resistance.

Tensile strength: Tensile strength analysis was performed for cured samples by Zwick Z005 with a speed of 500 mm/min speed. Samples were cured at 160° C. for 20 minutes and standard tensile specimens were cut from rubber sheet according to ISO 37 standard.

Rebound: Rebound measurements were performed for cured samples on a Bareiss digi test II Rebound Resilience Tester at a temperature of 70° C. Samples were cured at 170° C. for 12 minutes as round shape of 28 mm diameter and 12 mm thickness.

Payne effect: The storage shear moduli (G') was evaluated by using Rubber Process Analyzer (RPA 2000) (Alpha Technologies, Akron, USA) at a temperature of 100° C., a constant frequency of 0.5 Hz and by strain sweep up to 100%. The Payne effect was calculated from different storage shear moduli at low strain (0.56%) and high strain (100%). Samples were prepared from unvulcanised sheet as round disk of 28 mm diameter and 8 mm thickness.

In accordance with the preceding, cross-linkable rubber compositions were prepared as described in the examples 1 and 2 and cross-linked. Materials mentioned in the tables were:

The NR rubber used was a TSR 20 rubber (mooney viscosity of 80)

The low cis butadiene rubber was NIPOL BR1250H and had a cis content of ≥30 to ≤55%

The high cis butadiene rubber had a cis content of ≥97.2%

The terpolymer of ethylene, acrylic ester and maleic anhydride was LOTADER® 3430 (Arkema).

The filler was Carbon Black N 330.

The silica was Solvay Highly Dispersible Silica (semi HDS)

RAE was a high viscosity aromatic process oil

6PPD denotes N-(1,3-dimethylbutyl)-N'-phenyl-p-phenylenediamine and was used as an antioxidant and antiozonant Koresin® (BASF) was a tackifier DBD denotes dibenzoylamidodiphenyldisulfide and was a peptizer In accordance with the preceding, cross-linkable rubber compositions were prepared as described in the tables below. In a first step, all rubber components were added and mixed, followed by a second step wherein all additives were added and mixed and a last step wherein the curing package was added.

EXAMPLE 1

The table below shows compositions using a low cis butadiene rubber as second rubber component. Amounts for the components are given in PHR. The composition R is a reference compound. The composition C1 is a comparative example without the Lotader® resin but an amount of carbon black as low as in the composition I2. The composition I2 is a composition with the terpolymer of ethylene, acrylic ester and maleic anhydride (Lotader®) according to the invention.

| components | Reference R amount (PHR) | Reference C1 (without Lotader®) amount (PHR) | I2 amount (PHR) |
|---|---|---|---|
| NR (TSR 20, mooney 80) | 65.00 | 65.00 | 65.00 |
| low cis butadiene rubber | 35.00 | 35.00 | 35.00 |

-continued

| components | Reference R amount (PHR) | Reference C1 (without Lotader ®) amount (PHR) | I2 amount (PHR) |
|---|---|---|---|
| N 330 Carbon Black | 63.00 | 58.00 | 58.00 |
| Silica (semi HDS) | 7.00 | 7.00 | 7.00 |
| RAE (processing oil) | 3.00 | 3.00 | 3.00 |
| Insoluble sulphur 20% oil, High Dispersable | 3.25 | 3.25 | 3.25 |
| TBBS (N-Tert-Butyl-2 benzo-thiazole sulfenamide) | 2.90 | 2.90 | 2.90 |
| Zinc oxyde (indirect) | 4.00 | 4.00 | 4.00 |
| Stearic Acid | 1.50 | 1.50 | 1.50 |
| PVI (CTP, N-(cyclohexylthio) phthalimide) | 0.30 | 0.30 | 0.30 |
| 6PPD | 2.00 | 2.00 | 2.00 |
| TMQ (Polymerized 2,2,4 tri methyl 1,2 di hydro quinoline) | 1.00 | 1.00 | 1.00 |
| Anti ozone wax | 1.50 | 1.50 | 1.50 |
| Koresin | 4.00 | 4.00 | 4.00 |
| DBD (Peptizer) | 0.10 | 0.10 | 0.10 |
| LOTADER ® 3430 resin | — | — | 15.00 |

The following table shows the results obtained from the cured compositions:

| Result | | R | C1 | I2 |
|---|---|---|---|---|
| Hardness (median) | °Sh A | 68.80 | 67.20 | 73.00 |
| Elongation at break | % | 271.43 | 289.64 | 367.72 |
| Tear strength (delft) | MPa | 7.05 | 5.21 | 8.50 |
| Mooney ML(1 + 1.5) 135° C. | M.U. | 65.60 | 61.50 | 59.60 |
| Rebound (70° C.) | % | 64.30 | 67.90 | 62.30 |
| Tan (70° C.) | | 0.13 | 0.13 | 0.14 |

The lower the Tan ∂ at 70° C., the lower is the hysteresis of the compound and the better for rolling resistance. A higher tensile strength of rubber compound means that the rubber compound has better mechanical property. A higher the rebound value means a compound having lower hysteresis property and better rolling resistance. A lower value G' at 0.56 strain hints to a lower hysteresis property.

As can be seen in the result table, using the terpolymer of ethylene, acrylic ester and maleic anhydride results in an increase in hardness, an increase in elongation at break and an improvement in tear strength. Further, the Mooney value was lower, while at the same time rebound remained at the same level as the reference compound and also Tan ∂ at 70° C. remains the same.

EXAMPLE 2

The table below shows the composition I2 in comparison to a composition I3 with the terpolymer of ethylene, acrylic ester and maleic anhydride (Lotader®) using a high cis butadiene rubber as second rubber component. Amounts for the components are given in PHR.

| components | amount (PHR) I2 | amount (PHR) I3 |
|---|---|---|
| NR (TSR 20, mooney 80) | 65.00 | 65.00 |
| low cis butadiene rubber | 35.00 | — |
| N 330 Carbon Black | 58.00 | 58.00 |
| Silica (semi HDS) | 7.00 | 7.00 |
| RAE (processing oil) | 3.00 | 3.00 |
| Insoluble sulphur 20% oil, High Dispersable | 3.25 | 3.25 |
| TBBS (N-Tert-Butyl-2 benzo-thiazole sulfenamide) | 2.90 | 2.90 |
| Zinc oxyde (indirect) | 4.00 | 4.00 |
| Stearic Acid | 1.50 | 1.50 |
| PVI (CTP, N-(cyclohexylthio) phthalimide) | 0.30 | 0.30 |
| 6PPD | 2.00 | 2.00 |
| TMQ (Polymerized 2,2,4 tri methyl 1,2 di hydro quinoline) | 1.00 | 1.00 |
| Anti ozone wax | 1.50 | 1.50 |
| Koresin | 4.00 | 4.00 |
| DBD (Peptizer) | 0.10 | 0.10 |
| High cis butadiene rubber | — | 35.00 |
| LOTADER ® 3430 resin | 15.00 | 15.00 |

The following table shows the results obtained from the cured compositions:

| Result | | I2 | I3 |
|---|---|---|---|
| Hardness (median) | °Sh A | 73.00 | 73.60 |
| Elongation at break | % | 367.72 | 352.63 |
| Tear strength (delft) | MPa | 8.50 | 12.22 |
| Mooney ML(1 + 1.5) 135° C. | M.U. | 59.60 | 52.40 |
| Rebound (70° C.) | % | 62.30 | 60.00 |
| Tan (70° C.) | | 0.14 | 0.16 |

As can be seen from this table, results are comparable for low cis and high cis butadiene rubber with Lotader® terpolymer in the composition.

Therefore, a terpolymer of ethylene, acrylic ester and maleic anhydride combined with a natural rubber and optionally a low cis or a high cis butadiene rubber results in a lower hysteresis while maintaining good mechanical properties. Such cross-linked rubber compositions are particularly usable for manufacturing a tyre rim cushion.

The invention claimed is:

1. A cross-linkable rubber composition, the cross-linkable rubber composition comprising:
   a natural rubber (NR),
   a filler, and
   a resin,
   characterised in that
the resin is a terpolymer of ethylene, acrylic ester and maleic anhydride and is present in an amount ranging from ≥5 phr to ≤20 phr, and
wherein the rubber composition further comprises a butadiene rubber, wherein the butadiene rubber has a cis content in the range of 25-50% or 75-99% by weight.

2. The rubber composition according to claim 1, wherein the natural rubber is present in an amount of at least 60 phr.

3. The rubber composition according to claim 1, wherein the filler is carbon black.

4. The rubber composition according to claim 3, wherein the carbon black is present in an amount ranging from ≥40 to ≤70 phr.

5. The rubber composition according to claim 1, wherein the terpolymer of ethylene, acrylic ester and maleic anhydride is present in an amount ranging from ≥10 to ≤15 phr.

6. A cross-linked rubber composition, characterised in that it is obtained by cross-linking a rubber composition according to claim 1.

7. The cross-linked rubber composition according to claim 6 with a tan delta value at 70° C. (determined from DMA measurements according to ASTM D5963, frequency 10 Hz, 0.1% dynamic strain) of ≤0.13 and a storage modulus G' of ≥8.5.

8. The cross-linked rubber composition according to claim 6 with a rebound value of ≥64%.

9. The cross-linked rubber composition according to claim 6 having a tensile strength according to ASTM D412 of ≥19.55 MPa.

10. The cross-linked rubber composition according to claim 6, having a payne value G' at 0.56% strain of ≤360 kPa, the payne value being determined at a temperature of 100° C. and a frequency of 0.5 Hz.

11. A tyre comprising a rim cushion, characterised in that the rim cushion comprises a cross-linked rubber composition according to claim 6.

* * * * *